July 22, 1941.
F. J. WITTMANN
2,249,925
DOUGH MOLDER
Filed May 15, 1940
3 Sheets-Sheet 1
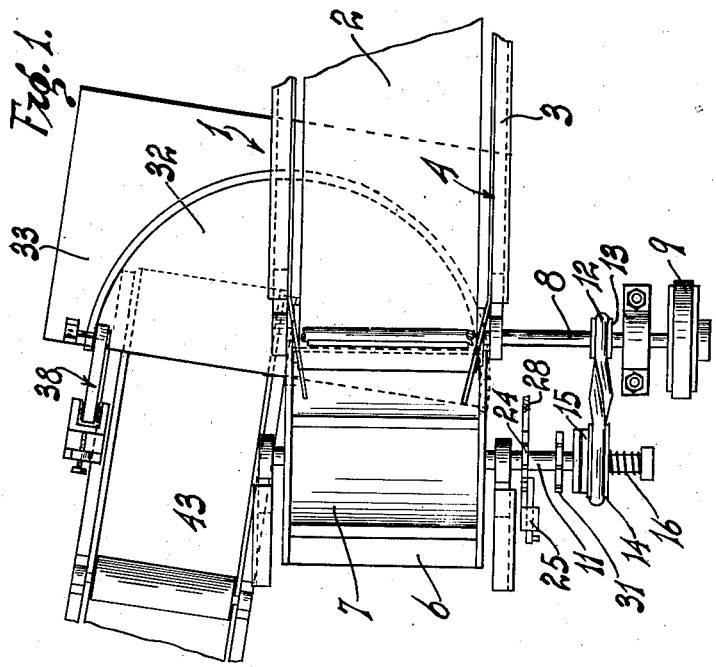
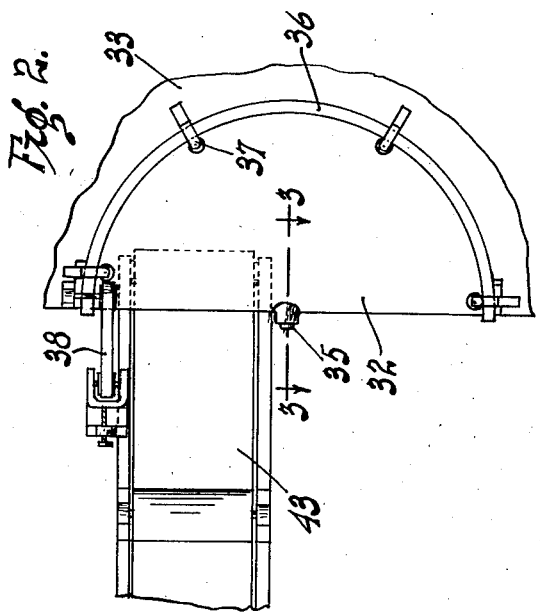
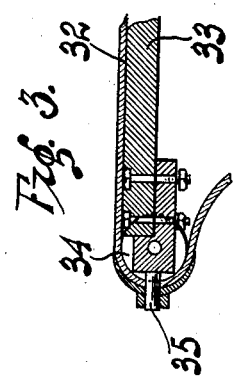
INVENTOR.
FRANK J. WITTMANN.
BY.
ATTORNEY.

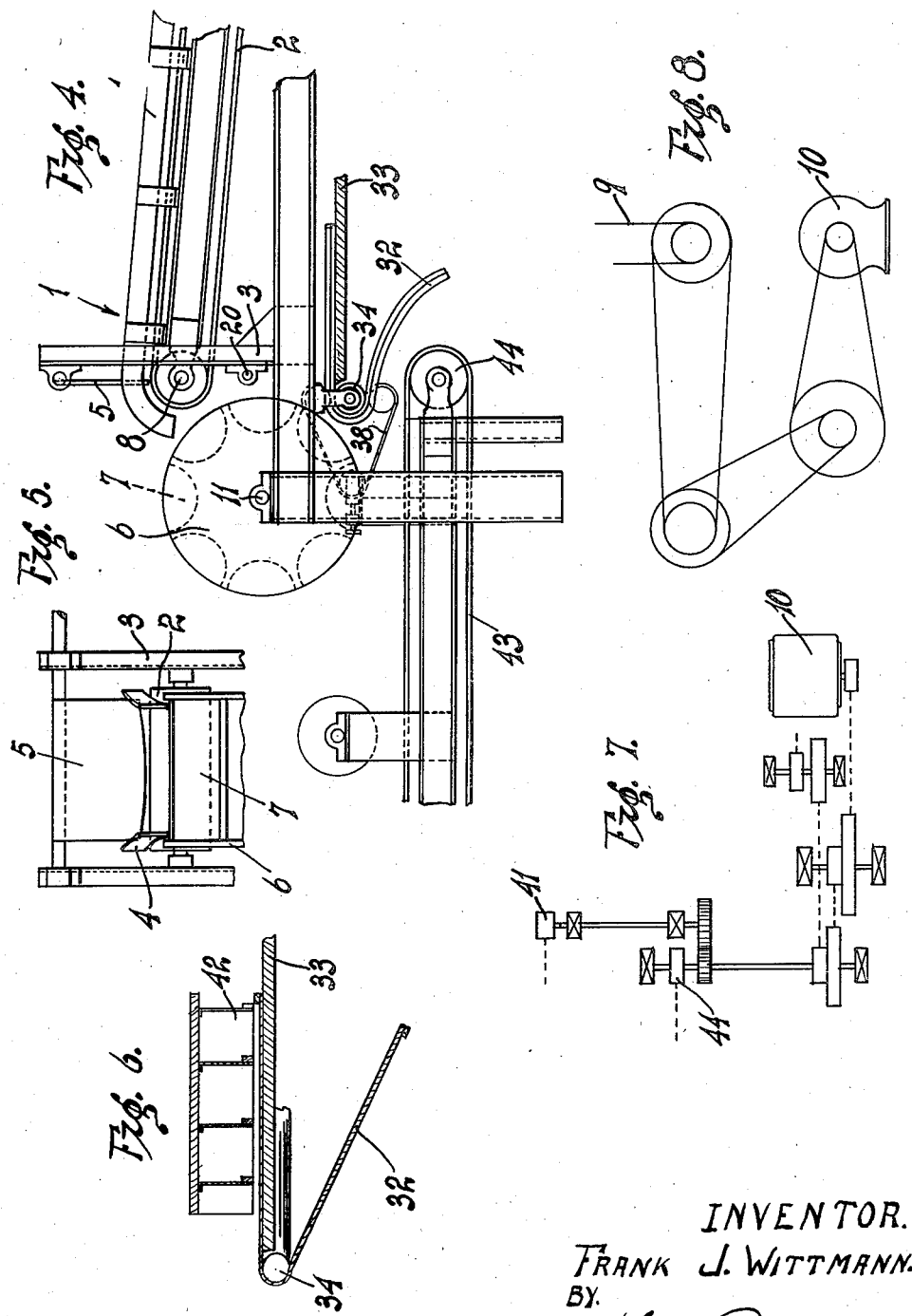

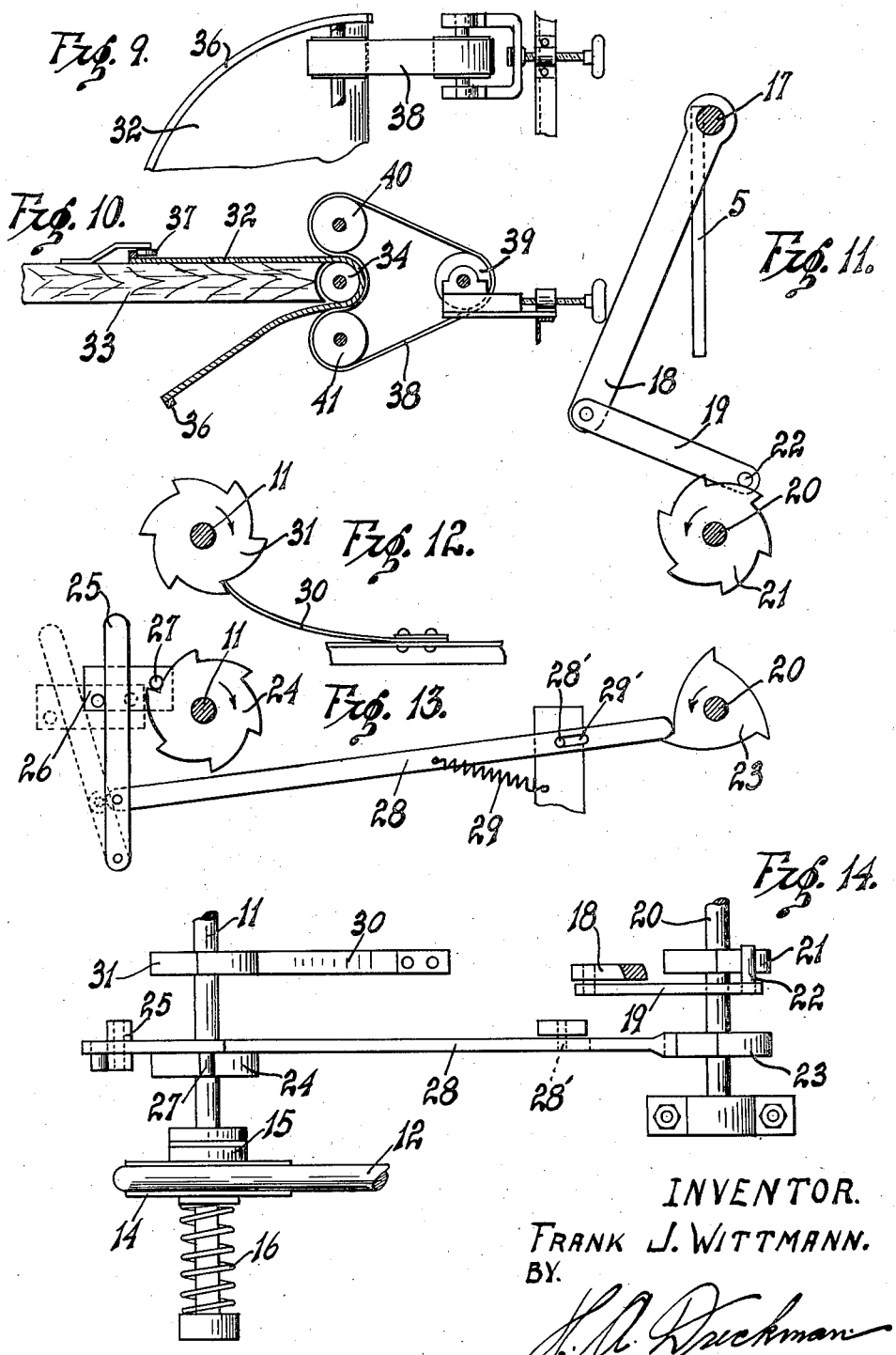

Patented July 22, 1941

2,249,925

UNITED STATES PATENT OFFICE 2,249,925

DOUGH MOLDER

Frank J. Wittmann, Los Angeles, Calif.

Application May 15, 1940, Serial No. 335,269

15 Claims. (Cl. 107—8)

This invention relates to a dough molder whereby masses of dough are handled in such a manner that two masses of dough are entwined to form a twisted loaf of the type heretofore prepared by hand.

An object of my invention is to provide a dough molder which segregates the masses of dough into pairs, then deposits the pairs on a novel conveyor where the pairs are twisted together to form a twist loaf.

Another object is to provide a novel dough molder including a semi-circular conveyor upon which the masses of dough are twisted together.

Still another object is to provide a novel means of depositing pairs of dough masses on a conveyor from a continuously moving conveyor carrying single masses of dough.

A further object is to provide a novel dough molder which will continuously mold a twisted loaf from a series of single masses of dough approaching the molder.

Other objects, advantages and features of invention may appear from the accompanying drawings, the subjoined detailed description and the appended claims.

In the drawings:

Figure 1 is a plan view of my dough molder with the intermittent drum movement eliminated.

Figure 2 is a plan view of the semi-circular twisting conveyor and a fragment of the discharge conveyor.

Figure 3 is an enlarged fragmentary sectional view taken on line 3—3 of Fig. 2.

Figure 4 is a fragmentary side elevation of my machine with the intermittent drum action removed.

Figure 5 is a fragmentary front view of the machine showing the trip plate.

Figure 6 is a transverse sectional view of the semi-circular twisting conveyor and the stationary flaps above said conveyor.

Figure 7 is a diagrammatic plan view of the driving mechanism for the machine.

Figure 8 is a diagrammatic side elevation of the same.

Figure 9 is a fragmentary plan view of the semi-circular conveyor and the drive means therefor.

Figure 10 is a side elevation of the same.

Figure 11 is a side elevation of the trip plate without the ratchet arm.

Figure 12 is an end view of one of the teeth gears.

Figure 13 is a side view of the ratchet drive from the trip plate to the drum shaft.

Figure 14 is a fragmentary plan view of the same.

Referring more particularly to the drawings, my dough molder 1 includes an intake conveyor 2 which carries the dough to the molder in properly sized masses which have been previously weighed, and cut so that the completed loaf will conform to requirements, as will be subsequently described.

The endless conveyor 2 is journaled on the frame 3, which frame is preferably made of structural members, all of which is usual and well known.

Stationary guides 4 on each side of the conveyor 2 hold the dough on the conveyor and prevent it from accidentally falling off. The masses of dough on the conveyor 2 are arranged in spaced relation and are continuously loaded onto the conveyor. In the present invention, it is necessary to segregate the dough into duplex masses which are then twisted together to form the completed loaf.

A trip plate 5 is hingedly mounted at the discharge end of the conveyor 2. As each mass of dough is discharged from the conveyor, it strikes the plate 5, swinging the same outwardly, as viewed in Fig. 4. The trip plate controls the rotation of the accumulator drum, as will be further described.

An accumulator drum 6 is rotatably mounted at the discharge end of the conveyor 2 and slightly below the conveyor. This drum contains a plurality of peripheral pockets 7. The masses of dough from the conveyor 2 drop into the pocket 7—two in each pocket, and the drum is then rotated to bring the next pocket into charging position. The intermittent rotation of the drum 6 is controlled by the trip plate 5, as will be further described.

The conveyor 2 is continuously rotated by the pulley mounted on the shaft 8 which shaft is journaled on the frame 3. The shaft 8 may be driven by the belt 9 from the motor 10, the details of which will be further described.

The drum 6 is mounted on a shaft 11 which shaft is journaled on the frame 3. A belt 12 encircles pulleys 13, 14 on the shafts 8, 11, respectively. A friction clutch 15 on the shaft 11 connects the pulley 14 with the shaft. Thus, there is no direct drive on the shaft 11, but merely a frictional pull tending to rotate the shaft and the drum 6 in a clockwise direction. The amount of frictional pull on the shaft 11 can be varied by the spring 16 which spring presses the frictional faces of the clutch 15 together.

It will thus be evident that the drum 6 is constantly urged to rotate in a clockwise direction but this movement is controlled so that the drum only rotates step by step. The intermittent motion of the drum 6 will now be described.

The trip plate 5 is fixedly secured to a shaft 17 which extends horizontally above the conveyor 2. An arm 18 is rigidly fastened to one end of the shaft 17, and to the lower end of this arm there is pivotally attached a link 19. A horizontal shaft 20 below the shaft 8 is journaled on the frame 3. A toothed pinion 21 is fixedly attached to the shaft 20. A pin 22 on the link 19 engages the teeth of the pinion 21 and each time that the plate 5 is swung outwardly, by a mass of dough passing the same, the pinion 21 will be rotated counter-clockwise by the pin 22 engaging one of the teeth of said pinion. The plate 5 will then fall back to its normal vertical position and the pin 22 will engage the next tooth on the pinion.

A cam 23 is also fixedly secured to the shaft 20, and this cam will therefore rotate counter-clockwise with the shaft as said shaft is rotated by the linkage operated by the plate 5. I have here shown the pinion 21 as having 6 teeth while the cam 23 has only three risers. Thus, it will require two movements of the pinion 21 to move the cam 23 from the low to the high point of a cam surface. Thus, two masses of dough must pass the trip plate 5 in order to move the cam 23 from a low point of the dwell to a high point of that same dwell. This means that two masses of dough will be deposited in each of the pockets 7 before the drum 6 is rotated to present an empty pocket to the feeding position.

A toothed gear 24 is fixedly secured to the shaft 11. As previously stated, the shaft 11 is constantly urged to rotate in a clockwise direction by the belt 12 operating thru the clutch 15. This movement is restrained by a link 25 which is pivotally mounted adjacent the gear 24. A block 26 is slidably mounted on the link and a pin 27 in the block engages a tooth of the gear 24 to hold the gear against rotation. The block 26 is moved out of engagement of the gear 24 by means of the push rod 28. One end of the push rod bears against the cam 23 while the other end of the same is pivotally attached to the link 25. Thus, when the cam 23 is rotated, as previously described, the link 25 will be rocked on its pivot to the position shown in the dotted lines of Fig. 13. The pin 27 will then be disengaged from the gear 24 and this gear can rotate a limited distance, thus permitting rotation of the drum 6. As soon as the end of the rod 28 has passed the high point on the cam 23, it is returned to normal position by the spring 29. The end of the rod 28 which engages the cam 23 is held in proper position by the pin 28' which enters the slot 29' on the rod. The pin 27 now reengages the tooth of the gear 24, and the rotation of the shaft 11 and drum 6 is stopped. Reverse rotation of the shaft 11 is prevented by the spring finger 30 engaging the toothed wheel 31. This toothed wheel is fixedly secured to the shaft 11.

This step by step rotation of the drum 6 carries the two masses of dough in the loaded pockets to a point where the dough is dumped upon the twisting conveyor 32. The twisting conveyor is made of flexible material and is disc-like in shape. However, the twisting conveyor is so mounted that only a semi-circular portion thereof is operative to twist the dough.

The conveyor operates on a flat table 33 and is bent over the end of the table along its diameter. A roller 34 at the end of the table provides an anti-friction surface over which the conveyor rolls. A pin 35 protrudes from the end of the table and projects thru the center of the conveyor 32, thereby holding the conveyor in position on the table as far as horizontal movement is concerned.

A flange 36 on the edge of the conveyor is engaged by rollers 37, said rollers being mounted on top of the table 33. Thus, the upper or operative area of the conveyor is held taut on the table. The conveyor is rotated preferably thru a friction drive consisting of a belt 38 which is pressed against the portion of the conveyor which bends over the roller 34. The belt travels over idlers 39 and 40 and over the driving pulley 41. The pulley 41 is driven from the motor 10 thru suitable gearing or belts.

The two masses of dough are simultaneously dumped from the drum 6 onto the upper surface of the twisting conveyor 32. The masses of dough then traverse a semi-circular path, and while they are moving, they pass under flexible aprons 42 which hang above the upper surface of the conveyor 32. These aprons exert a drag on the dough, causing the adjacent masses to turn over and over, thus twisting them together. Furthermore, the peripheral speed of the conveyor 32 is greater than the speed adjacent the center, and the retarding action of the aprons 42, together with this difference in speed, causes the two masses of dough to be wrapped about each other.

A discharge conveyor 43 carries the twisted dough away from the conveyor 32. The fact that the conveyor 32 has a straight edge, i. e., its operative surface is semi-circular in form—enables the masses of dough to be taken off of this conveyor without a scraper, baffle plate, or the like.

The completed loaf drops direct onto the discharge conveyor and is carried to a suitable point where it may be placed in the ovens. The conveyor 43 is also driven from the motor 10 thru the pulley 44. The portion of the conveyor 32 which extends below the table 33 is entirely inoperative while in this position and no function is performed by it.

The operation of my machine is as follows:

Masses of dough are fed onto the conveyor 2 continuously, the masses being slightly spaced apart on the conveyor. As each mass of dough strikes the trip plate 5, it swings this plate outwardly and then drops into one of the pockets in the drum 6. When two masses of dough have passed the plate 5 and have dropped into the same pocket in the drum, the tripping mechanism has been actuated thru the pinion 21 and the cam 23 to release the drum shaft 11, and thus permits partial rotation of the drum. As the pockets reach a position above the twisting conveyor 32, the two masses of dough are tripped onto this conveyor and are then carried in a semi-circular path on the conveyor 32. While being transported by the conveyor 32, the two masses of dough are twisted together due to the action of the aprons 42 and the radial positioning of the dough on the conveyor. When the dough has traveled approximately 180 degrees on the conveyor 32, it has been twisted into a single loaf and then drops direct upon the discharge conveyor 43 where it is gathered and placed into pans to be baked.

Having described my invention, I claim:

1. A dough twister comprising a twisting conveyor, consisting of a flexible disk mounting means for the disk whereby a flat semi-circular surface is presented to receive the dough, and drive means for the twisting conveyor whereby the conveyor is rotated.

2. A dough twister comprising a twisting conveyor, consisting of a flexible disk mounting means for the disk whereby a flat semi-circular surface is presented to receive the dough, and drive means for the twisting conveyor whereby the conveyor is rotated, and means mounted above the twisting conveyor yieldably engaging the dough on said conveyor, whereby the dough is retarded and caused to roll on the twisting conveyor.

3. A dough twister comprising a twisting conveyor, consisting of a flexible disk mounting means for the disk whereby a flat semi-circular surface is presented to receive the dough, and drive means for the twisting conveyor whereby the conveyor is rotated, and means engaging the edge of the flat semi-circular portion of the flexible disk whereby said portion of the flexible disk is held taut and flat.

4. A dough twister comprising a twisting conveyor, consisting of a flexible disk mounting means for the disk whereby a flat semi-circular surface is presented to receive the dough, and drive means for the twisting conveyor whereby the conveyor is rotated, and means mounted above the twisting conveyor yieldably engaging the dough on said conveyor, whereby the dough is retarded and caused to roll on the twisting conveyor, and means engaging the edge of the flat semi-circular portion of the flexible disk whereby said portion of the flexible disk is held taut and flat.

5. A dough twister comprising a twisting conveyor, consisting of a flexible disk mounting means for the disk whereby a flat semi-circular surface is presented to receive the dough, and drive means for the twisting conveyor whereby the conveyor is rotated, and means mounted above the twisting conveyor yieldably engaging the dough on said conveyor, whereby the dough is retarded and caused to roll on the twisting conveyor, said last named means comprising a plurality of flexible aprons mounted above the flat surface of the twisting conveyor, and said aprons engaging the masses of dough on the twisting conveyor.

6. A dough twister comprising a twisting conveyor, said twisting conveyor including a flexible disk, a table on which the disk is mounted, said disk being bent over the edge of the table, whereby a semi-circular flat surface is presented on the top of the table, and means journalling the disk, and drive means for the twisting conveyor.

7. A dough twister comprising a twisting conveyor, said twisting conveyor including a flexible disk, a table on which the disk is mounted, said disk being bent over the edge of the table, whereby a semi-circular flat surface is presented on the top of the table, and means journalling the disk, and drive means for the twisting conveyor, and means engaging the edge of the twisting conveyor, said means being mounted on the table whereby the semi-circular flat area of the twisting conveyor is held taut on the table.

8. A dough twister comprising a twisting conveyor, consisting of a flexible disk mounting means for the disk whereby a flat semi-circular surface is presented to receive the dough, and drive means for the twisting conveyor whereby the conveyor is rotated, and means depositing masses of dough on the flat surface of the twisting conveyor, the masses of dough being positioned substantially radially of the flat surface of the twisting conveyor.

9. A dough twister comprising a twisting conveyor, said twisting conveyor including a flexible disk, a table on which the disk is mounted, said disk being bent over the edge of the table, whereby a semi-circular flat surface is presented on the top of the table, and means journalling the disk, and drive means for the twisting conveyor, and means depositing masses of dough on the flat surface substantially radially of the flat surface of the twisting conveyor.

10. A dough twister comprising a twisting conveyor, said twisting conveyor including a flexible disk, a table on which the disk is mounted, said disk being bent over the edge of the table, whereby a semi-circular flat surface is presented on the top of the table, a pin extending through the disk from the edge of the table, whereby the disk is journalled, and drive means for the twisting conveyor.

11. A dough twister comprising a twisting conveyor, said twisting conveyor including a flexible disk, a table on which the disk is mounted, said disk being bent over the edge of the table, whereby a semi-circular flat surface is presented on the top of the table, a pin extending through the disk from the edge of the table, whereby the disk is journalled, and drive means for the twisting conveyor, and means mounted above the twisting conveyor yieldably engaging the dough on said conveyor, whereby the dough is retarded and caused to roll on the twisting conveyor.

12. A dough twister comprising a twisting conveyor, said twisting conveyor including a flexible disk, a table on which the disk is mounted, said disk being bent over the edge of the table, whereby a semi-circular flat surface is presented on the top of the table, a pin extending through the disk from the edge of the table, whereby the disk is journalled, and drive means for the twisting conveyor, and means mounted above the twisting conveyor yieldably engaging the dough on said conveyor, whereby the dough is retarded and caused to roll on the twisting conveyor, said last named means comprising a plurality of flexible aprons engaging the masses of dough on the twisting conveyor.

13. A dough twister comprising a twisting conveyor, said twisting conveyor including a flexible disk, a table on which the disk is mounted, said disk being bent over the edge of the table, whereby a semi-circular flat surface is presented on the top of the table, a pin extending through the disk from the edge of the table, whereby the disk is journalled, and drive means for the twisting conveyor, and means engaging the edge of the twisting conveyor, said means being mounted on the table, whereby the semi-circular flat area of the twisting conveyor is held taut on the table.

14. A dough twister comprising a twisting conveyor, said twisting conveyor including a flexible disk, a table on which the disk is mounted, said disk being bent over the edge of the table, whereby a semi-circular flat surface is presented on the top of the table, a pin extending through the disk from the edge of the table, whereby the disk is journalled, and drive means for the twisting conveyor, and means engaging the edge of the twisting conveyor, said means being mounted on the table, whereby the semi-circular flat area of the twisting conveyor is held taut on the table, and means mounted above the twisting conveyor yieldably engaging the dough on said conveyor, whereby the dough is retarded, and caused to roll on the twisting conveyor.

15. A dough twister comprising a twisting conveyor, said twisting conveyor including a flexible disk, a table on which the disk is mounted, said disk being bent over the edge of the table, whereby a semi-circular flat surface is presented on the top of the table, a pin extending through the disk from the edge of the table, whereby the disk is journalled, and drive means for the twisting conveyor, and means engaging the edge of the twisting conveyor, said means being mounted on the table, whereby the semi-circular flat area of the twisting conveyor is held taut on the table, and means mounted above the twisting conveyor yieldably engaging the dough on said conveyor, whereby the dough is retarded, and caused to roll on the twisting conveyor, and means to deposit masses of dough on the twisting conveyor substantially radially of the flat portion of the twisting conveyor.

FRANK J. WITTMANN.